US006947429B1

(12) United States Patent
Heiss et al.

(10) Patent No.: US 6,947,429 B1
(45) Date of Patent: Sep. 20, 2005

(54) METHOD FOR ALIGNING OF PACKET LOSS PRIORITY INFORMATION IN A DATA-PACKET SWITCHING COMMUNICATION DEVICE

(75) Inventors: Herbert Heiss, Unterhaching (DE); Peter Rau, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/856,919

(22) PCT Filed: Nov. 12, 1999

(86) PCT No.: PCT/DE99/03613

§ 371 (c)(1),
(2), (4) Date: May 29, 2001

(87) PCT Pub. No.: WO00/32005

PCT Pub. Date: Jun. 2, 2000

(30) Foreign Application Priority Data

Nov. 26, 1998 (DE) ................................ 198 54 656

(51) Int. Cl.[7] .......................... H04L 12/28; H04L 12/56
(52) U.S. Cl. .................. 370/395.62; 370/389; 370/413
(58) Field of Search ................................ 370/412, 413, 370/389, 392, 395.1, 395.43, 395.62; 710/54, 710/57

(56) References Cited

U.S. PATENT DOCUMENTS 5,267,232 A * 11/1993 Katsube et al. ............. 370/230
5,519,698 A * 5/1996 Lyles et al. .................. 370/411
5,553,061 A    9/1996 Waggener, Jr. et al.
5,724,358 A    3/1998 Headrick et al.
5,764,626 A * 6/1998 VanDervort ................. 370/232
5,959,991 A * 9/1999 Hatono et al. ............ 370/235.1
6,081,505 A * 6/2000 Kilkki ......................... 370/230
6,396,815 B1 * 5/2002 Greaves et al. ............. 370/256
6,680,949 B1 * 1/2004 Briem ......................... 370/418
6,762,996 B1 * 7/2004 Petit ............................ 370/230

OTHER PUBLICATIONS

Smith, A.J. et al.: "A New Multiplexor for B-ISDN Connectionless Data Traffic", Proceedings of the Conference on Telecommunications, GB, London, IEE, Db. Conf. 4, 1993, Seiten 281-286, XP000473738.

* cited by examiner

*Primary Examiner*—Duc Ho
(74) *Attorney, Agent, or Firm*—Bell Boyd & Lloyd LLC

(57) ABSTRACT

A method for aligning packet loss priority information for overload control of a data-packet-switching communications device wherein data packets and respectively allocated packet loss priority information are transmitted to the communications device and buffered in relation to a specific connection. The packet loss priority information is then read from the buffered data packets and modified according to the connection type or the application-specific data traffic type. After the data packet has been switched in the communications device, the original packet loss priority information which was switched with the data packets is re-inserted into the corresponding data packet.

7 Claims, 1 Drawing Sheet

METHOD FOR ALIGNING OF PACKET LOSS PRIORITY INFORMATION IN A DATA-PACKET SWITCHING COMMUNICATION DEVICE

BACKGROUND OF THE INVENTION

1. Field of the Invention

The present invention relates, generally, to a method for aligning packet loss priority information in a data-packet-switching communications device and, more specifically, to such a method wherein the packet loss priority information may be modified depending on a connection type or an application-specific data traffic type and the original packet loss priority information is restored after a data packet has been switched in a respective communications device.

2. Description of the Prior Art

In existing and future packet-oriented communications networks, different monitoring strategies are and will be provided to monitor variable and defined data packet transmission rates. Particularly in communications networks operated on a cell-oriented basis, for example ATM communications networks operating according to the Asynchronous Transfer Mode, loss priorities are allocated to ATM cells which are to be transmitted and, with reference to the loss priorities, a decision is made in a communications device concerning the further switching of the respective data packet. On the basis of the allocated loss priorities, a decision is made in the respective communications device with the aid of a monitoring procedure; in particular, concerning the further switching or rejection of an ATM cell. The data packets which can be rejected within the ATM communications network in the event of overload without the loss of real-time-related, connection-individual information, thus can be defined via the packet-individual allocation of loss priorities.

Furthermore, different traffic classes or connection types are defined in the proposal entitled "Traffic Management 4.0" of the ATM Forum 1996. These include Constant Bit Rate (CBR) connections, Variable Bit Rate (VBR) connections, Available Bit Rate (ABR) connections and Unspecified Bit Rate (UBR) connections. The Constant Bit Rate connection type is used for virtual connections, for which a defined transmission bandwidth must be continuously provided for the duration of the virtual connection. The Constant Bit Rate connection type is therefore used, in particular, for real-time-related, virtual applications such as voice transmission.

The Variable Bit Rate connection type is defined for virtual connections with variable or changing transmission requirements in the proposal entitled "Traffic Management 4.0" of the ATM Forum 1996. Knowledge of the traffic characteristics of the application represented by the respective virtual connection is advantageous for this purpose. A distinction is made, in particular, between real-time-related and non-real-time-related Variable Bit Rate connections wherein, for example, transmission of real-time-related video data with a variable bandwidth is to be understood as a real-time-related Variable Bit Rate connection. The Available Bit Rate connection type enables applications to which no special transmission bandwidth is allocated. The applications can use the transmission bandwidth which is currently possible in the ATM communications network, wherein a maximum and a minimum transmission rate are allocated, in each case, to the respective Available Bit Rate connection and these limit values must not be exceeded or undershot. On the basis of the usage factor of the respective ATM communications device, the currently possible transmission rate is indicated to the transmission device with the aid of control cells periodically inserted into the ATM cell stream. With the aid thereof, following the arrival of the control cells in the transmission device, the transmission rate of the ATM cells of the respective virtual connection is adapted to the currently possible transmission rate. In the case of the Unspecified Bit Rate connection type, no defined cell loss information or cell delay times are allocated to the respective virtual connection. Instead, the Unspecified Bit Rate connection type represents a "best-effort" service class which is provided in practice, for example, for Internet applications.

The loss priorities allocated to the respective ATM cells of a virtual connection, i.e. the cell loss priority information transmitted in an external data packet header with the data packet, are evaluated during the switching of the individual virtual connections within an ATM communications device, depending on the connection type. The connection type of the respective ATM cell is thus initially defined and, following alignment of the connection type priority with the loss priority of the respective ATM cell, a decision is made with the aid of the monitoring procedure concerning the forwarding or rejection of the ATM cell. The data packets are then further processed or switched in the ATM communications device with the aid of the switching elements, inter alia on the basis of the cell loss priority information recorded in the external data packet header.

Two connection types, the Constant Data Rate connection type and connections with a low loss priority, have primarily been taken into account in known and practically relevant methods for aligning cell loss priority information. According to the definition of the aforementioned connection classes by the proposal entitled "Traffic Management Specification 4.0" of the ATM Forum, the newly added connection classes must be taken into account in existing data-packet-switching communications devices and the loss priorities which differ according to the connection type must therefore be aligned with the existing communications devices; i.e., in particular with their switching networks. In the known methods, particularly those relating to Constant Bit Rate connections, a check is carried out by the communications device or its switching elements on the cell loss priority information, wherein a low loss priority is allocated as standard to Constant Bit Rate connections so that these connections are never rejected in the event of overload. In contrast to this, in the case of virtual connections with a high loss priority, for example Variable Bit Rate connections, the associated ATM cells are rejected within the communications device in the event of overload.

An object of the present invention, therefore, is to improve the alignment of packet loss priority information for overload control of a data-packet-switching communications device.

SUMMARY OF THE INVENTION

Thus, according to the present invention, the packet loss priority information is read from the incoming data packets. The packet loss priority information of the buffered data packet is then modified depending on the connection type or application-specific data traffic type and the originally stored packet loss priority information is restored after a data packet has been switched in the communications device in the respective data packet. With the aid of the method according to the present invention, the connection type or application-specific data traffic type is advantageously defined during the set-up of a virtual connection within the communications device and, if necessary, i.e. depending on the connection type or application-specific data traffic type, the packet loss priority information is modified. The existing switching elements may continue to be used unchanged via this modification, prior to the switching of data packets, of the loss priorities depending on the connection-specific or application-specific data traffic type.

According to another embodiment of the method of the present invention, packet loss priority information read from the buffered data packet is recorded in an additional, communications-device-specific data packet header. The additional data packet header is then attached to the buffered data packet and the buffered data packet, including the attached, additional data packet header, is switched in the communications device. This ensures that, with the aid of the additional data packet header provided for switching within the communications device, also known in the technical field as an "internal" header, the original packet loss priority information is particularly advantageously transferred to the output unit of the communications device. Ineffective buffering of the original packet loss priority information in a further memory area and its separate transfer, for example with the aid of the control unit, to the output unit, in which the latter is re-inserted into the data packet, is thereby avoided.

According to a further advantageous embodiment of the present method different loss priorities are allocated by the packet loss priority information to the respective data packet. The allocation of different loss priorities with the aid of the packet loss priority information is based on the proposal entitled "Traffic Management Specification 4.0" of the ATM Forum 1996.

A further advantage of the method according to the present invention is that the respective data packets of a group of data packets are modified with packet loss priority information depending on the connection type or application-specific data traffic type. Thus, for example, in a Variable Bit Rate connection, a number of data packets of the virtual connection can be combined into groups, wherein the packet loss priority information of the data packets of the relevant group can be modified independently of a further group of the virtual connection. This makes the prioritization options which are available within the communications device more flexible for a virtual connection and, in order to define the packet loss priority information of a group, it suffices to define the packet loss priority information of one data packet of the group. Consequently, the further data packets of the group can be further processed without checking the packet loss priority information as with the checked data packet. The definition of the packet loss priority information of the further data packets of a group is thus avoided, thereby dynamically reducing the load imposed on available computer resources.

According to a further embodiment of the present invention, after a data packet has been switched in the communications device, the additional communications-device-specific data packet header attached to the data packet is removed. Thus, after each data packet has been switched, the data packet, including the original packet loss priority information, is advantageously forwarded by the communications device to the communications network.

In cell-switching communications devices, the packet loss priority information is advantageously defined by cell loss priority information. The allocation of cell loss priority information in cell-switching communications devices, particularly those operating according to the Asynchronous Transfer Mode, is based on the proposal entitled "Traffic Management Specification Version 4.0" of the ATM Forum 1996. According to this proposal, information which includes one bit, the "Cell Loss Priority" bit, is provided in each ATM cell for the allocation of cell loss priority information.

Additional features and advantages of the present invention are described in, and will be apparent from, the Detailed Description of the Preferred Embodiments and the Drawings.

DETAILED DESCRIPTION OF THE PREFERRED EMBODIMENTS

Figure 1:
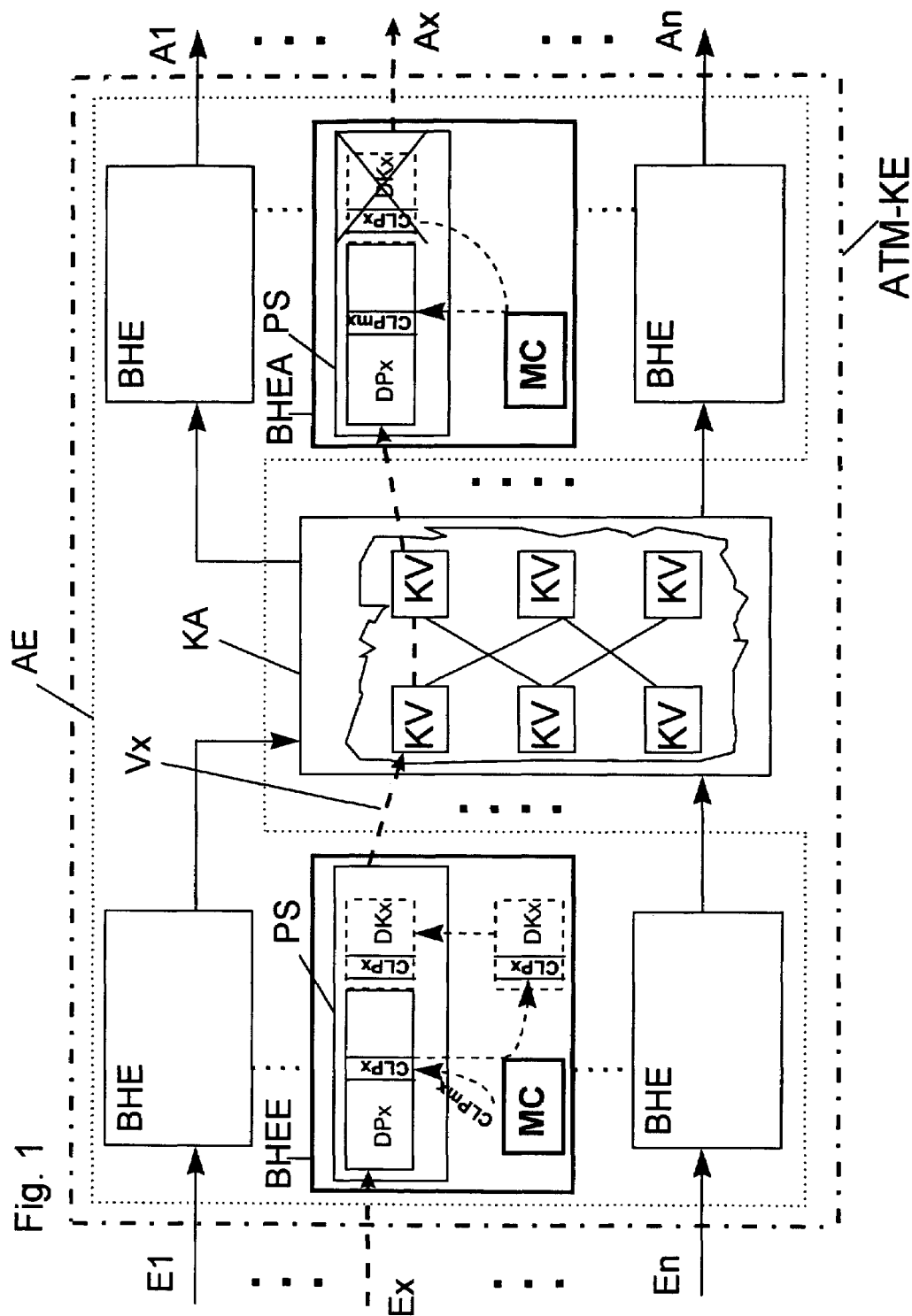
FIG. 1 shows a block diagram schematic of an ATM communications device to which the method of the present invention is directed.

In the block diagram according to FIG. 1, an ATM communications device ATM-KE operating according to the Asynchronous Transfer Mode is shown schematically, to which a multiplicity of offering lines E1 to En and a multiplicity of serving lines A1 to An are connected with the aid of connection units AE. Of these, the offering lines E1 to En, the serving lines A1 to An, and one of a number of possible connection units AE are shown as examples in FIG. 1. Via the offering lines E1 to En and the serving lines A1 to An, ATM cells are transmitted via virtual connections according to the Asynchronous Transfer Mode, wherein variable or defined transmission rates are provided for the transmission of the ATM cells of virtual connections. In the block diagram, a virtual connection Vx is shown as an example by a broken line with its offering line Ex and its serving line Ax. As shown in FIG. 1, the connection unit AE has a number of processing devices BHE, one processing device BHE being allocated in each case to each of the offering lines E1 to En and to the serving lines A1 to An. To explain the method according to the present invention, the offering and serving processing devices BHEE/BHEA allocated to the virtual connection Vx are shown in the block diagram as examples, the offering processing device BHEE being connected to the serving line Ex and the serving processing device BHEA being connected to the serving line Ax. The ATM cells DPx transmitted in the virtual connection Vx are supplied to the offering processing device BHEE of the connection units AE. The ATM cells DPx of the virtual connection Vx are then forwarded to a switching arrangement KA of the ATM communications device ATM-KE, a multi-stage structure with a number of interconnecting switching matrices KV being shown as an example in FIG. 1 for the switching arrangement KA. However, any single-stage or multi-stage switching arrangements may be provided. The ATM cells DPx of the virtual connection Vx are then forwarded by the serving processing device BHEA from the switching arrangement KA to the serving line Ax.

The processing devices BHE/BHEE/BHEA are equipped with a memory unit PS and a microcontroller MC, the memory unit PS and the microcontroller MC of the offering and serving processing devices BHEE/BHEA being shown in FIG. 1 as examples. On arrival of an ATM cell DPx of the virtual connection Vx in the ATM communications device ATM-KE, the ATM cell DPx is forwarded to the serving handling device BHEE of the connection unit AE, where it is buffered in the memory unit PS. The packet loss priority information CLPx transferred in the buffered ATM cell DPx is read from the ATM cell DPx with the aid of the microcontroller MC and is recorded in an additional, communications-device-specific data packet header DKx. The modified packet loss priority information CLPmx is defined for the respective connection type for the ATM communications device ATM-KE and is stored in a table; for example, a low loss priority is always provided for a Constant Bit Rate connection. The modified packet loss priority information provided for the respective connection type is then recorded in the ATM cell DPx or stored in the memory unit PS instead of the packet loss priority information CLPx, depending on the connection type of the virtual connection Vx. In addition, the additional data packet header DKx containing, inter alia, the original packet loss priority information CLPx is attached by the microcontroller MC to the ATM cell DPx. The ATM cell DPx, including the attached additional data packet header DKx, is then transferred to the switching arrangement KA, where it is switched with the aid of the switching matrices KV.

Via the switching information indicated in the additional data packet header DKx, the respective ATM cell DPx, including the attached additional data packet header DKx, is switched to the serving processing device BHEA which is connected to the serving line Ax, where it is buffered in the memory unit PS. The original packet loss priority information CLPx is read by the microcontroller MC during a read cycle from the buffered, additional data packet header DKx attached to the ATM cell DPx and is recorded in the associated ATM cell DPx instead of the modified packet loss priority information CLPmx. The additional data packet header DKx attached to the ATM cell DPx is then removed and the ATM cell DPx is forwarded by the serving processing device BHEA to the serving line Ax.

The application of the method according to the present invention is not restricted to ATM communications devices ATM-KE, but can be used in all communications devices that switch data packets DPx in which packet loss priority information CLPx allocated to the data packets DPx is transferred with the data packets DPx.

Indeed, although the present invention has been described with reference to specific embodiments, those of skill in the art will recognize that changes may be made thereto without departing from the spirit and scope of the invention as set forth in the hereafter appended claims.

We claim:

1. A method for aligning packet loss priority information for overload control of a communications device that switches data packets, the method comprising the steps of:
   transferring and buffering in a memory area, via the communications device, the data packets and respectively allocated loss priority information in relation to a specific connection;
   reading the packet loss priority information from the buffered data packets;
   modifying the packet loss priority information of the buffered data packet depending on the specific connection or application-specific data traffic type; and
   restoring, after a data packet has been switched in the communications device, the original packet loss priority information in the corresponding data packet.

2. A method for aligning packet loss priority information for overload control of a communications device as claimed in claim 1, the method further comprising the steps of:
   recording the packet loss priority information read from the buffered data packet in an additional communications-device-specific data packet header;
   attaching the additional data packet header to the buffered data packet; and
   switching the buffered data packet, including the attached additional data packet header, in the communications device.

3. A method for aligning packet loss priority information for overload control of a communications device as claimed in claim 1, the method further comprising the step of:
   allocating different loss priorities to the respective data packet by the packet loss priority information.

4. A method for aligning packet loss priority information for overload control of a communications device as claimed in claim 1, the method further comprising the step of:
   modifying the respective data packets of a group of data packets with packet loss priority information depending on at least one of the connection type and the application-specific data traffic type.

5. A method for aligning packet loss priority information for overload control of a communications device as claimed in claim 2, the method further comprising the step of:
   removing the additional communications-device-specific data packet header attached to the data packet after a data packet has been switched in the communications device.

6. A method for aligning packet loss priority information for overload control of a communications device as claimed in claim 1, wherein, in cell-switching communications devices, the packet loss priority information is cell loss priority information.

7. A method for aligning packet loss priority information for overload control of a communications device as claimed in claim 6, wherein the cell loss priority information is formed from information having one bit.

* * * * *